June 7, 1960  R. G. PIETY  2,940,061
SIGNAL RECORDING SYSTEM
Filed Oct. 24, 1955  2 Sheets-Sheet 1

*INVENTOR.*
R. G. PIETY
BY *Hudson & Young*
ATTORNEYS

United States Patent Office 2,940,061
Patented June 7, 1960

2,940,061

SIGNAL RECORDING SYSTEM

Raymond G. Piety, Bartlesville, Okla., assignor to Phillips Petroleum Company, a corporation of Delaware Filed Oct. 24, 1955, Ser. No. 542,431

6 Claims. (Cl. 340—15)

This invention relates to improved data presentation systems for seismic surveying.

In geophysical prospecting valuable information can often be obtained concerning subsurface formations by means of seismic surveys. A plurality of seismometers is positioned at or near the surface of the earth in a predetermined geometric array and an explosive charge is detonated at a region spaced therefrom. Vibrations emitted from the explosive charge travel downwardly into the earth and are reflected from subterranean formations back to the seismometers. The seismometers establish corresponding electrical signals which are amplified and recorded. The signals usually are recorded side by side on a common chart. The reflected vibrations generally appear as maximum and minimum amplitudes. In making surveys of this type it is common practice to detonate explosive charges in sequence along a common line. The relative positions of the reflections on the several records thus provide indications of the dip of generally horizontal reflecting surfaces.

In accordance with the present invention there is provided an improved system for presenting the data obtained by seismic surveys. This system comprises, generally, recording the positive and negative peaks of the produced electrical signals separately on two channels of a recorder. In one embodiment, the output signals of the seismometers are amplified and differentiated. The differentiated signal is clipped to provide pulses of substantially constant amplitude. These pulses are again differentiated and applied directly to a first positive gate circuit and through a phase inverter to a negative gate circuit. The original amplified signal is applied as an input signal to both of the gate circuits. The output pulses from the two gate circuits are representative of the amplitudes of the respective positive and negative signals to be recorded. These pulses energize respective channels of a recorder. The lengths of time the respective channels of the recorder are energized are representative of the amplitudes of the respective output pulses from the gate circuits. These pulses can be represented, for example, by the length of bars on a photographic recording strip.

Accordingly, it is an object of this invention to provide an improved system for recording seismic vibrations.

Another object is to provide apparatus to record positive and negative portions of a signal separately.

A further object is to provide apparatus for recording seismic signals wherein the recorder is actuated for times representative of the amplitudes of the signal.

Other objects, advantages and features of the invention should become apparent from the following detailed description taken in conjunction with the accompanying drawing in which.

Figure 1:
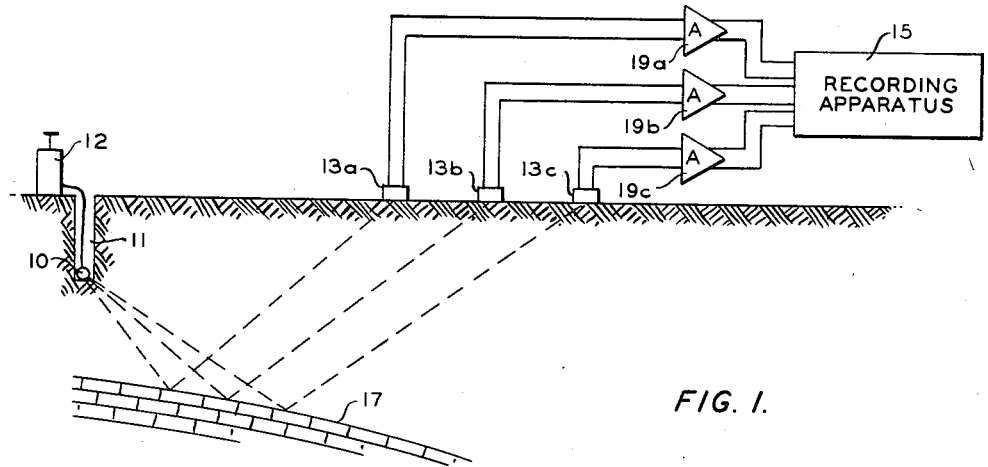
Figure 1 is a schematic representation of a typical seismic exploration system.

Referring now to the drawing in detail and to Figure 1 in particular, there is shown a seismic exploration system wherein an explosive charge 10 is positioned within a shot hole 11 and electrically connected to a detonator 12 at the surface. Detonation of explosive charge 10 results in vibrations being transmitted outwardly in all directions. A plurality of vibration responsive seismometers 13a, 13b and 13c is positioned at or near the surface of the earth in a predetermined geometric array with respect to shot hole 11. Vibrational waves travel downwardly from explosive charge 10 and are reflected upwardly from a bed such as 17 to the several seismometers. It should be evident from an inspection of Figure 1 that the reflected waves arrive at the three illustrated seismometers at slightly different times. Seismometer 13a receives vibrations first and seismometers 13b and 13c receive the vibrations at later times. By measuring the times of arrival of the reflected signals at the several seismometers, the depth and dip of bed 17 can be calculated if the velocities of the seismic waves in the formations between bed 17 and the surface are known.

In order to determine the times of arrival of the reflected waves at the several seismometers, it is common practice to amplify and record the seismometer output signals. The output signals from seismometers 13a, 13b and 13c are applied to the inputs of respective seismic amplifiers 19a, 19b and 19c. The outputs of these three amplifiers are applied to respective input channels of recording apparatus 15 of the present invention.

Figure 2:
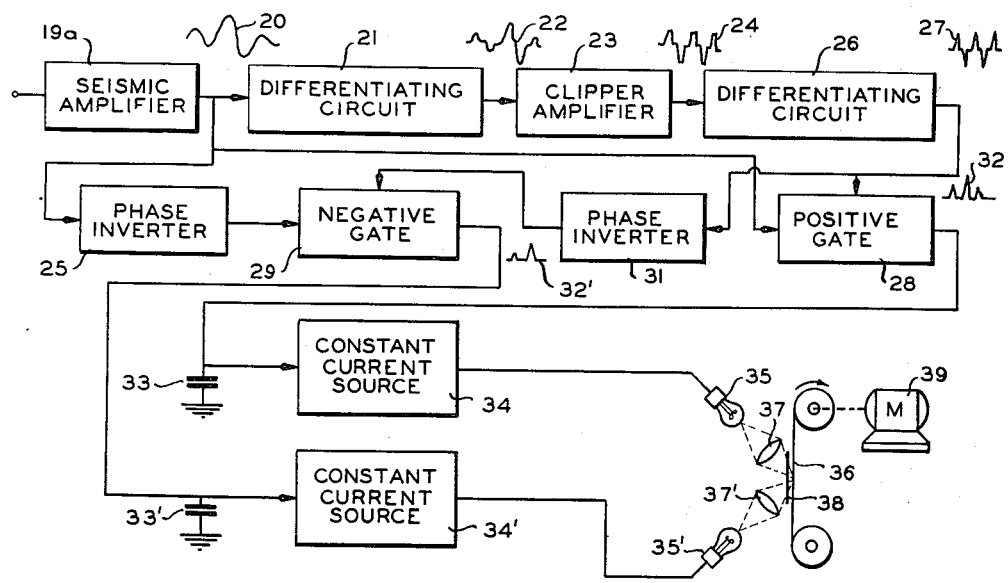
Figure 2 is a schematic representation of the recording system of this invention.

Figure 2 is a schematic representation of the apparatus of this invention which is provided to record the output signal from amplifier 19a, for example. Curve 20 illustrates a typical output signal from amplifier 19a which represents the arrival of a reflected wave from bed 17. This signal is applied to the input of a first differentiating circuit 21 which provides an output signal of the form illustrated by curve 22. This signal is applied to the input of a clipper amplifier 23 which provides an output signal of the form shown by curve 24. This latter signal is applied to the input of a second differentiating circuit 26 which provides an output signal of the form shown by curve 27. The signal represented by curve 27 is applied directly to a positive gate circuit 28 and through a phase inverter 31 to a negative gate circuit 29. Gate circuit 28 is thus opened by the positive pulses of curve 27 and gate circuit 29 is opened by the negative pulses of curve 27. The output signal of amplifier 19a is applied to the input of gate circuit 28. The output signal of amplifier 19a is applied through a phase inverter 25 to the input of gate circuit 29.

Gate circuit 28 is opened when positive pulses of curve 27 are applied thereto. These pulses are applied to gate circuit 28 at substantially the same times as the positive portion of curve 20 arrives at the gate circuit. This results in an output signal from gate 28 of the form shown by curve 32. The amplitudes of these pulses are representative of the amplitudes of successive positive portions of curve 20. These positive pulses charge a capacitor 33. The charge on capacitor 33 leaks off through a constant current source 34 to energize a first lamp 35. Lamp 35 is focused on a photographic film 36 by means of a lens 37 and a mask 38. Film 36 is moved past mask 38 by a motor 39. The output pulses from gate circuit 29 are represented by curve 32'. These pulses charge a second capacitor 33'. The charge on capacitor 33' leaks off through a second constant current source 34' to energize a second lamp 35'. Lamp 35' is focused on a second portion of film 36 by a lens 37' and mask 38.

Figures 3A, 3B:
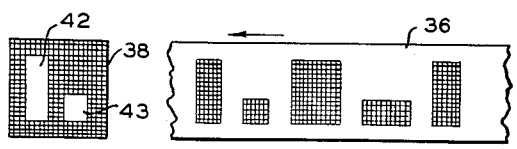
Figures 3a and 3b illustrate a first embodiment of a photographic recorder.

In Figures 3a and 3b there is shown a first embodiment of the photographic recording system. Mask 38 is provided with first and second slots 42 and 43 of different widths. Lamp 35 illuminates slot 42 and lamp 35' illuminates slot 43. Film 36 moves past mask 38 so that the film is exposed for times representative of the lengths of time the respective lamps are illuminated. The positive and negative pulses are thus recorded separately by bands of different widths. The lengths of these bands longitudinally of film 36 are representative of the sequential amplitudes of the input signal.

Figures 4A, 4B:
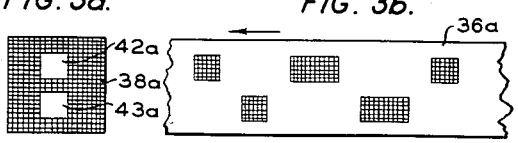
Figures 4a and 4b illustrate a second embodiment of a photographic recorder.

In Figures 4a and 4b there is shown a second embodiment of the optical recording system. Mask 38a is provided with respective slots 42a and 43a which are of the same width but which cover separate sides of film 36a. The exposures on the upper portion of film 36a thus represent the positive peaks of the seismic signal whereas the exposures on the lower portion of the film represent the negative peaks. The lengths of the exposed bars are representative of the amplitudes of the signal being recorded.

Figure 5:
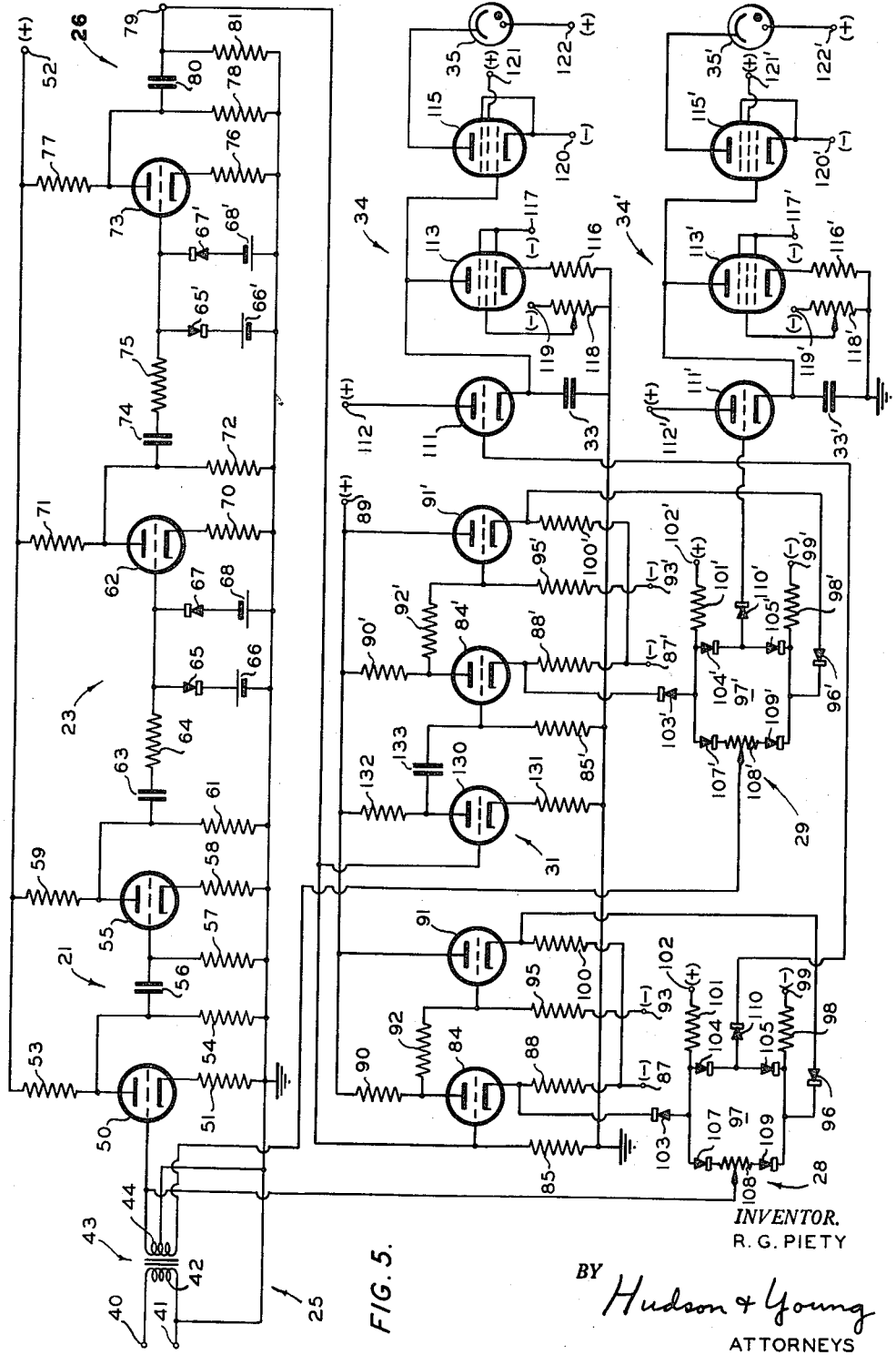
Figure 5 is a schematic circuit diagram of the apparatus illustrated in Figure 2.

In Figure 5 there is shown a schematic representation of the circuit of Figure 2. Output terminals 40 and 41 of seismic amplifier 19a are connected to the end terminals of the primary winding 42 of a transformer 43. Terminal 41 is connected to ground. The first end terminal of the secondary transformer winding 44 is connected to the control grid of a triode 50. Transformer 43 is connected so that the potential applied to the control grid of triode 50 is in phase with the output signal of amplifier 19a. The center tap of winding 44 is connected to ground. The cathode of triode 50 is connected to ground through a resistor 51. The anode of triode 50 is connected to a positive potential terminal 52 through a resistor 53. The anode of triode 50 is connected to ground through a resistor 54 and to the control grid of a triode 55 through a capacitor 56. The control grid of triode 55 is connected to ground through a resistor 57. The cathode of triode 55 is connected to ground through a resistor 58. The anode of triode 55 is connected to terminal 52 through a resistor 59. The anode of triode 55 is connected to ground through a resistor 61 and to the control grid of a triode 62 through a capacitor 63 and a resistor 64 which are connected in series relationship.

The control grid of triode 62 is connected to ground through a first rectifier 65 and a potential source 66 which are connected in series relationship. The control grid of triode 62 is also connected to ground through a second rectifier 67 and a second potential source 68 which are connected in series relationship. Rectifier 65 is connected so as to ground signals of amplitude greater than a predetermined positive value. Rectifier 67 is connected to ground negative signals of amplitude greater than a predetermined value.

The cathode of triode 62 is connected to ground through a resistor 70. The anode of triode 62 is connected to terminal 52 through a resistor 71. The anode of triode 62 is connected to ground through a resistor 72 and to the control grid of a triode 73 through a capacitor 74 and a resistor 75 which are connected in series relationship. The control grid of triode 73 is connected to ground through rectifiers 65' and 67' and batteries 66' and 68' which correspond to the rectifiers and batteries previously described. The cathode of triode 73 is connected to ground through a resistor 76. The anode of triode 73 is connected to terminal 52 through a resistor 77. The anode of triode 73 is connected to ground through a resistor 78 and to a terminal 79 through a capacitor 80. A resistor 81 is connected between terminal 79 and ground.

The circuit thus far described comprises differentiating circuit 21, clipper amplifier 23 and differentiating circuit 26. Capacitors 56 and 80 are of sufficiently low values to provide a differentiating action in conjunction with respective resistors 57 and 81. The two sets of diodes are biased so that pulses of amplitudes greater than preselected positive and negative values are shorted to ground.

Terminal 79 is connected to positive gate 28 and negative gate 29. Considering positive gate 28, for example, terminal 79 is connected to the control grid of a triode 84. The control grid of triode 84 is connected to ground through a resistor 85. The cathode of triode 84 is connected to a negative potential terminal 87 through a resistor 88. The anode of triode 84 is connected to a positive potential terminal 89 through a resistor 90. The anode of triode 84 is also connected to the control grid of a triode 91 through a resistor 92. The control grid of triode 91 is connected to a negative potential terminal 93 through a resistor 95. The anode of triode 91 is connected to terminal 89. The cathode of triode 91 is connected to negative terminal 87 through a resistor 100.

The cathode of triode 91 is also connected through a rectifier 96 to the first terminal of a rectifier bridge circuit 97. This first terminal of bridge circuit 97 is connected through a resistor 98 to a negative potential terminal 99. A resistor 101 is connected between a positive potential terminal 102 and the first terminal of a rectifier 103. The second terminal of rectifier 103 is connected to the cathode of triode 84. The first terminal of rectifier 103 is connected through rectifiers 104 and 105 to the first-mentioned terminal of bridge 97. The first terminal of rectifier 103 is also connected through a rectifier 107, a potentiometer 108 and a rectifier 109 to the first-mentioned terminal of bridge 97. The first end terminal of transformer winding 44 is connected to the contactor of potentiometer 108. The junction between rectifiers 104 and 105 is connected through a rectifier 110 to the control grid of a triode 111. The cathode of triode 111 is connected to the first terminal of capacitor 33. The second terminal of capacitor 33 is connected to ground. The anode of triode 111 is connected to a positive potential terminal 112.

Gate circuit 28 is of the form described in greater detail by Millman and Puckett in Proc. I.R.E., 43, 29–37 (1955). Positive output pulses from differentiating circuit 26 open gate circuit 28 for the transmission of positive pulses from amplifier 19a. The period of the output signal from amplifier 19a is low compared to the time constant of the differentiating circuits so that gate 28 is opened at substantially the same time as the positive pulses from amplifier 19a are applied thereto. The signal from amplifier 19a, which is transmitted through gate circuit 28, results in triode 111 becoming conductive to charge capacitor 33. This charge leaks off capacitor 33 through circuit 34 at a constant predetermined rate.

The first terminal of capacitor 33 is connected to the anode of a first pentode 113 and to the control grid of a second pentode 115. The cathode of pentode 113 is connected to ground through a resistor 116. The control grid and suppressor grid of pentode 113 are connected to a negative potential terminal 117. The screen grid of pentode 113 is connected to the contactor of a potentiometer 118. One end terminal of a potentiometer 118 is connected to a negative potential terminal 119 and the second end terminal is connected to ground. The cathode and suppressor grid of pentode 115 are connected to a negative potential terminal 120. The screen grid of pentode 115 is connected to a positive potential terminal 121. The anode of pentode 115 is connected to the cathode of a gas-filled glow discharge tube 35. The anode of tube 35 is connected to a positive potential terminal 122.

Conduction through pentode 113 serves to discharge capacitor 33. The rate at which the capacitor is discharged can be adjusted by regulating the bias on the screen grid of the petode. Pentode 115 conducts as long as the potential across capacitor 33 is greater than a predetermined value. Conduction by pentode 115 results in lamp 35 being illuminated. The operating potentials in circuit 34 can be adjusted so that lamp 35 is illuminated only when input pulses greater than a predetermined value are applied to recording apparatus 15.

Terminal 79 is also connected to the grid of a triode 130 of phase inverter 31. The cathode of triode 130 is connected to ground through a resistor 131. The anode of triode 130 is connected to terminal 89 through a resistor 132. The anode of triode 130 is also connected thrrough a capacitor 133 to the control grid of a triode 84' which corresponds to triode 84. Gate circuit 29 and current source 34' are identical to gate circuit 28 and source 34 and corresponding elements are indicated by like primed reference numerals. The contactor of potentiometer 108' is connected to the second end terminal of transformer winding 44 so that the signal applied to gate 29 is 180° out of phase with the signal applied to gate 28.

From the foregoing description it should be apparent that there is provided an improved system to record seismic signals. The positive and negative peaks are recorded separately. A photographic system of recording has been described for purposes of illustration. However, it should be evident that the electrical signals from gate circuits 28 and 29 can be recorded in any desired manner, as by a magnetic recorder, for example. It is thus intended that the recording apparatus of Figure 1 be a schematic representation of apparatus including any conventional signal recorder. Reflections from a common bed can readily be identified in a plurality of records. While the invention has been described in conjunction with present preferred embodiments, it obviously is not limited thereto.

What is claimed is:

1. Apparatus for recording seismic signals comprising a recorder having two channels, means to provide an electrical signal which varies in amplitude in accordance with the seismic vibrations to be measured, means to differentiate said signal, first circuit means to transmit only that portion of the signal which is of amplitude greater than a reference potential, second circuit means to transmit only that portion of the signal which is of amplitude less than said reference potential, first signal storage means, means under control of the transmitted differentiated signal to apply the original signal greater than said reference potential to said first storage means, means to discharge said first storage means at a first predetermined rate, means responsive to said first storage means to energize the first channel of said recorder at such times as the signal on said first storage means is greater than a first predetermined value, second signal storage means, means under control of the transmitted differentiated signal to apply the original signal less than said reference potential to said second storage means, means to discharge said second storage means at a second predetermined rate, and means responsive to said second storage means to energize the second channel of said recorder at such times as the signal on said second storage means is greater than a second predetermined value.

2. Apparatus for recording seismic signals, the amplitudes of which vary in two directions from a reference value, comprising a two channel recorder, means to provide an electrical signal which varies in amplitude in accordance with the seismic vibrations to be measured, means to differentiate said signal, a first gate circuit, a second gate circuit, means to apply the differentiated signal to said gate circuits, said first gate circuit being opened responsive to the differentiated electrical signal being of amplitude in one of said directions, said second gate circuit being opened responsive to the differentiated electrical signal being of amplitude in the other of said directions, means to apply said electrical signal to the input of said first gate circuit, phase inverting means to apply said electrical signal to the input of said second gate circuit, means responsive to the output of said first gate circuit to energize the first channel of said recorder for times representative of the amplitudes of the output pulses from said first gate circuit, and means responsive to the output of said second gate circuit to energize the second channel of siad recorder for times representative of the amplitudes of the output pulses from said second gate circuit.

3. The combination in accordance with claim 1 wherein said recorder comprises a photographic film and first and second sources of radiation directed on adjacent portions of said film, said means to energize said channels of said recorder comprise means to energize respective ones of said sources of radiation, and means to move said film relative to said sources of radiation.

4. The combination in accordance with claim 1 wherein said recorder comprises a photographic film, first and second sources of radiation, and first and second masks positioned between said film and respective ones of said sources of radiation, said means to energize said channels of said recorder comprise means to energize respective ones of said sources of radiation, and means to move said film relative to said sources of radiation.

5. The combination in accordance with claim 4 wherein said first and second masks are positioned so that said first and second sources of radiation are directed on respective sides of said film.

6. The combination in accordance with claim 4 wherein said first and second masks are of different widths to permit passage of bands of radiation of different widths from respective ones of said sources to said film.

References Cited in the file of this patent

UNITED STATES PATENTS

| | | |
|---|---|---|
| 2,051,153 | Rieber | Aug. 18, 1936 |
| 2,381,009 | Siderman | Aug. 7, 1945 |
| 2,721,989 | Gates | Oct. 25, 1955 |
| 2,767,388 | Rust | Oct. 16, 1956 |
| 2,791,288 | Meier | May 7, 1957 |